US012075759B2

(12) United States Patent
Dingus et al.

(10) Patent No.: US 12,075,759 B2
(45) Date of Patent: Sep. 3, 2024

(54) DAIRY CATTLE BREEDING STATUS INDICATOR TECHNOLOGY

(71) Applicant: Mark L. Anderson, Spring Valley, WI (US)

(72) Inventors: T. Boyd Dingus, Spring Valley, WI (US); Ky Garrett Pohler, College Station, TX (US)

(73) Assignee: Mark L. Anderson, Hudson, WI (US)

(*) Notice: Subject to any disclaimer, the term of this patent is extended or adjusted under 35 U.S.C. 154(b) by 630 days.

(21) Appl. No.: 17/048,386

(22) PCT Filed: Apr. 17, 2019

(86) PCT No.: PCT/US2019/027999
§ 371 (c)(1),
(2) Date: Oct. 16, 2020

(87) PCT Pub. No.: WO2019/204529
PCT Pub. Date: Oct. 24, 2019

(65) Prior Publication Data
US 2021/0100220 A1    Apr. 8, 2021

Related U.S. Application Data

(60) Provisional application No. 62/762,038, filed on Apr. 17, 2018.

(51) Int. Cl.
*A01K 29/00* (2006.01)
*A61D 17/00* (2006.01)

(52) U.S. Cl.
CPC .......... *A01K 29/005* (2013.01); *A61D 17/002* (2013.01)

(58) Field of Classification Search
CPC ..................... A01K 29/005; A61D 17/002
(Continued)

(56) References Cited

U.S. PATENT DOCUMENTS 5,542,431 A * 8/1996 Starzl .................. A61D 17/002
600/551
5,566,679 A * 10/1996 Herriott ............... A61D 17/002
600/551

(Continued)

OTHER PUBLICATIONS

International Search Report (ISR) For PCT International Application No. PCT/US19/27999 Citing References U.S. Pat. No. 6,467,430 (D1), U.S. Pat. No. 5,542,431,(D2), and US2011/0178423 (D3).
(Continued)

*Primary Examiner* — Jason M Sims
*Assistant Examiner* — Mitchell E Alter
(74) *Attorney, Agent, or Firm* — Skinner and Associates; Joel Skinner

(57) ABSTRACT

A bovine estrus detection device includes a generally rectangular base having sides and ends, the base having a predetermined length and a predetermined width, and the width being less than the length, the base having a first side and. a second side. The first side of the base has a central region having a first color and end regions having a second color. The second color is different from the first color. An adhesive is disposed on the second side of the base for coupling the base to a female cow or heifer. A removable coating is disposed over the first side of the base. The removable coating is exposed for contact by male or female cows mounting the female cow or heifer to which the device is attached. The coating is adapted to being removed by mounting male or female cows, whereby the first and second colors become visible. Exposure of the first color in the central region is an. accurate predictor of activation and estrus.

17 Claims, 15 Drawing Sheets

(58) Field of Classification Search
USPC .......................................................... 600/551
See application file for complete search history.

(56) References Cited

U.S. PATENT DOCUMENTS

| | | | | |
|---|---|---|---|---|
| D630,953 S | * | 1/2011 | Anderson | .................... D10/57 |
| 2003/0066491 A1 | * | 4/2003 | Stampe | ............... A61D 17/002 |
| | | | | 119/174 |
| 2008/0110406 A1 | * | 5/2008 | Anderson | ........... A01K 29/005 |
| | | | | 119/174 |
| 2011/0178423 A1 | * | 7/2011 | Hatch | ................. A61D 17/002 |
| | | | | 600/551 |
| 2019/0105145 A1 | | 4/2019 | Stampe | |

OTHER PUBLICATIONS

Reply Filed to Preliminary Office Action in Brazilian Patent Application BR 11 2020 021281 4 (Non English—500000US-PetitionAsFiled(ROA)-07082023.pdf).
Best English Translation of Brazilian Reply (ProposedReplyToBrazilianOA.pdf).

* cited by examiner

DAIRY CATTLE BREEDING STATUS INDICATOR TECHNOLOGY

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

CROSS-REFERENCE TO RELATED APPLICATIONS, IF ANY

Not applicable.

BACKGROUND OF THE INVENTION

1. Field of the Invention

The present invention relates, generally, to animal reproduction apparatus, systems and methods. More particularly, the invention relates to ruminant animal reproduction apparatus, systems and methods. Most particularly, the invention relates to a system, device and method for beef and dairy cow herd reproduction management. The devices and methods provide a means of managing breeding of dairy cows via visual means.

2. Background Information

Existing technology in this field is believed to have various limitations and shortcomings. For this and other reasons, a need exists for the present invention.

All US patents and patent applications, and all other published documents mentioned anywhere in this application are incorporated by reference in their entirety.

BRIEF SUMMARY OF THE INVENTION

The invention provides a breeding status detector for determining the breeding status of the animal, such as estrus and puberty status at the start of a breeding season; insemination in a natural service breeding program; and pregnancy confirmation. Mounting activity in cows is usually the first visual clue that a cow is in estrus or coming into estrus. The lack of mounting activity is also helpful to the herdsperson because the lack of estrus is an sign that the cow is either pregnant or is not having a normal estrus cycle. The detector is configured to be secured externally to the rump portion of the subject cow or other animal. Visual activation of the detector indicates when the cow is mounted by a second cow. The detector has a patch-like structure with a visual, colored, indicator layer that is normally obscured by a flood coat. The indicator layer is exposed upon mounting of the first cow by the second cow. The mounting activity rubs off the flood coat. This is observed by the herdsman, who then can take various actions.

The detector and method of use are safe, accurate, reliable, durable, and easy to use. Several embodiments of the invention are disclosed herein.

In a first aspect, the invention provides a bovine estrus detection device, comprising a generally rectangular base having sides and ends, the base having a predetermined length and a predetermined width, the width being less than the length, the base having a first side and a second side, and wherein the first side of the base has a central region having a first color and end regions having a second color, the second color being different from the first color;

an adhesive disposed on the second side of the base for coupling the base to a female cow or heifer; and a removable coating disposed over the first side of the base, the removable coating being exposed for contact by male or female cows mounting the female cow or heifer to which the device is attached, and adapted to being removed by such mounting male or female cows, whereby the first and second colors become visible.

In a second aspect, the invention provides a bovine estrus detection device, comprising a generally rectangular base having sides and ends, the base having a predetermined length and a predetermined width, the width being less than the length, the base having a first side and a second side, and wherein the first side of the base has a first color;

an adhesive disposed on the second side of the base for coupling the base to a female cow or heifer;

a first removable coating disposed over the first side of the base at a central region of the first side, the first removable coating having a second color, the second color being different from the first color;

a second removable coating disposed over the first side of the base at end regions of the first side, the second removable coating having a third color;

the first and second removable coatings being exposed for contact by male or female cows mounting the female cow or heifer to which the device is attached, and adapted to being removed by such mounting male or female cows, whereby the first color becomes visible.

The aspects, features, advantages, benefits and objects of the invention will become clear to those skilled in the art by reference to the following description, claims and drawings.

DETAILED DESCRIPTION

Figure 1:
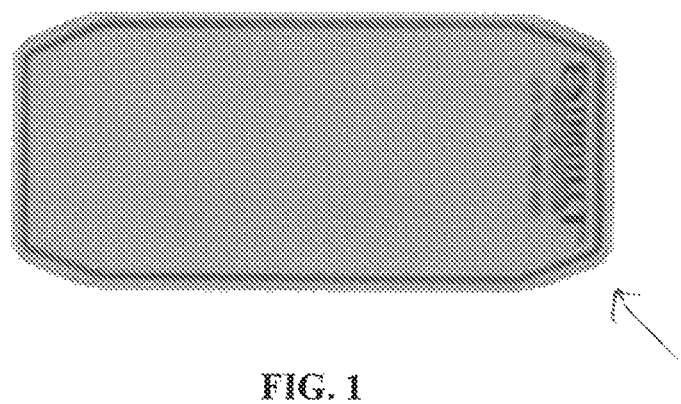
FIG. 1 is a top view of an ESTROTECT® Estrus Detector that is part of the Prior Art.

The invention provides a breeding status indicator or detector for determining the breeding status of a female cow or heifer. Breeding status includes: (1) estrus and puberty status at the start of a breeding season, (2) insemination in a natural service breeding program, and (3) pregnancy confirmation. Mounting activity in cows is usually the first visual clue that a cow is in estrus (heat or standing heat) or coming into estrus. The lack of mounting activity is also helpful to the herdsman (user) because the lack of estrus is an sign that the cow is either pregnant or is not having a normal estrus cycle. The detector is configured to be secured externally to the rump portion of the subject cow or other animal (first cow). Visual activation of the detector indicates when the first animal is mounted by a second cow. Multiple mountings over a predetermined period of time by the same or further second cows may also occur.

The detector has a patch-like structure with a visual, colored, indicator layer that is normally obscured by a flood coat. The indicator layer is exposed upon mounting of the first cow by the second cow. The mounting activity rubs and wears off the flood coat. This is looked for and observed by the herdsman, who then can take various actions or refrain taking actions depending upon the identify and characteristics of the particular animal, the demonstrated breeding status of the animal, timing and other factors.

To determine whether cows/heifers have started having normal estrus cycles prior to a breeding season, the detectors are applied to the rumps of cows 18-26 days before the start of the season. The cows are then monitored for the 18-26 day period. This is the typical length of an estrus cycle in a cow. If the detector has not been activated there is a likelihood that the cow/heifer has not started having normal estrus cycles. This again can be confirmed by a secondary test such as ultrasound or reproductive tract scoring. If, on the other hand, the detector has been activated over the time period, the cow/heifer is likely having a normal estrus cycle and thus will have a better chance of conceiving early in the breeding season. Detector activation is defined by fifty percent (50%) or more of the signal layer being shown. Thus, if at least 50% of the signal layer is shown during the monitoring period, the cow/heifer is likely having a normal estrus cycle. Puberty status and/or estrus cycling status at the start of a breeding season is a major factor in pregnancy success.

To determine whether cows/heifers have been bred in a Natural Service Breeding program, the detectors are applied to the cows/heifers 18-26 days before the start of breeding. The cows are then monitored for the 18-26 day period. If during that time a detector has not bee activated, there is a likelihood that the cow/heifer has not been in heat and has not been bred by a bull by virtue of its not being in estrus (and therefore mounted). Such cows should then be monitored closely over the next following cycle to see if they are bred by a bull or bulls or to otherwise show that the cow is not likely to conceive during the short natural service breeding season Detector activation on the other hand serves as an indication that the cow/heifer has likely been bred and is inseminated and has a chance to conceive early in the breeding season. Detector activation is again defined by fifty percent (50%) or more of the signal layer being shown. This may be confirmed by a secondary test such as ultrasound or rectal palpitation at the end of the breeding season. Thus, if at least 50% of the signal layer is shown during the monitoring period, the cow/heifer has likely been bred.

To confirm pregnancy of a cow, the detector is applied a predetermined period of time after being inseminated in an Artificial Insemination (AI) program, or after males (bulls) are removed from the cows in a herd in the case of Natural Service breeding. Cows with detectors applied are visually monitored over a period of approximately 18-26 days. This is the typical length of an estrus cycle in a cow. If during that time a detector has not been activated, there is a likelihood that the cow is pregnant by virtue of its not being in estrus (and therefore mounted). This may be further confirmed by a secondary test such as ultra sound, rectal palpitation, or the like. Detector activation (50% of the signal layer shown) on the other hand, serves as an indication that either insemination did not occur or the cow is otherwise not pregnant due to various factors which may then be considered and analyzed if necessary. Thus, if at least 50% of the signal layer is shown during the monitoring period, the cow has been mounted more than one time and is not likely pregnant.

Prior to application to cows/heifers, the detector should be kept warm, preferably approximately 100 F (38 C). The preferred placement site on a cow/heifer is halfway between the hip and tail head, even spaced perpendicular to the spine. Just before placement, the hair at the site should be brushed, preferably with the grain of the coat across the backbone of the back half of the cow. This removes dirt and shedding hair. Further, the surface area may be dried and cleaned with a clean, dry cloth. Lastly, the detector is placed on the deployment site, pressed down firmly and rubbed with a bare fingers. Cows/heifers are then released into their environment for monitoring. If and when mounting occurs, the flood coat is rubbed off by friction during mounting, which exposes the indicator layer. The indicator layers are preferably brightly colored, for example red/orange, green, blue, yellow or fuchsia, and may be fluorescent. True standing heat is detected when at least 50% of the indicator is exposed. Cows should be observed daily, for 30 minutes twice a day, preferably in early morning and late evening. Cows should be observed when they are away from their normal feeding station. Hot weather, high production, crowded conditions, or other high stress environments may discourage mounting activity. Cows in standing heat average about 1.5 mounts per hour and are in heat at least 6-8 hours.

Figure 2:
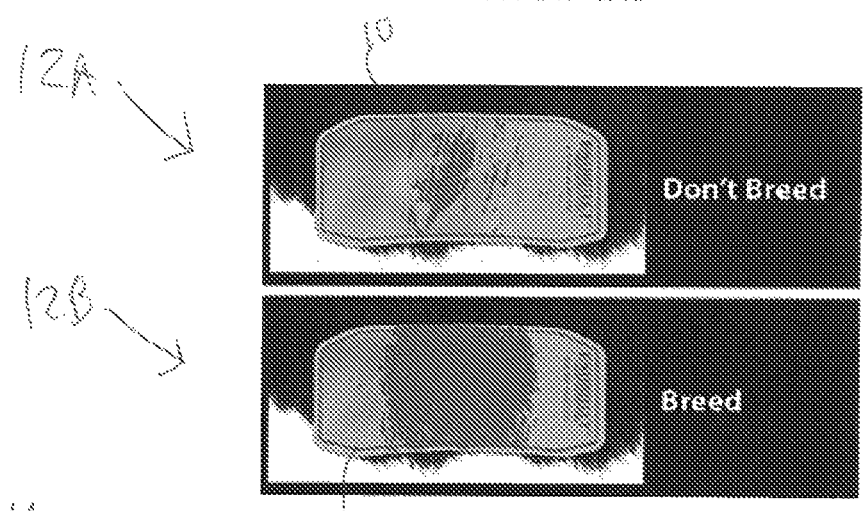
FIG. 2 illustrates not activated and activated states of the Prior Art detector of FIG. 1, respectively.
Figure 3:
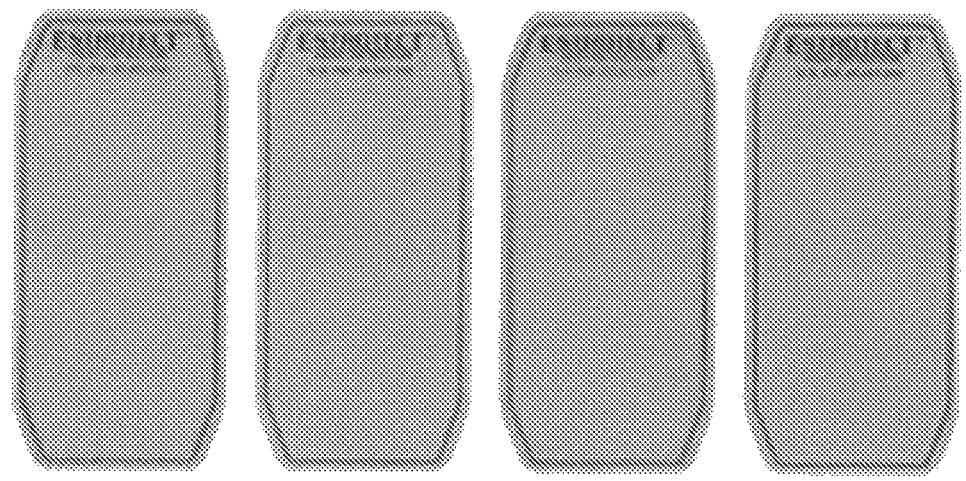
FIG. 3 shows a set of ESTROTECT® Etrus detector, each having a different color, which also forms part of the Prior Art.

FIGS. 1-3 generally show the state of the prior art. FIG. 1 is a top view of an ESTROTECT® Estrus Detector 10 manufactured and supplied by Rockway, Inc. of Spring Valley, Wis. USA. FIGS. 12A and 12B illustrate not activated and activated states of the Prior Art detector of FIG. 1, respectively. FIG. 3 shows a set of ESTROTECT Estrus detector, each having a different color, which also forms part of the Prior Art. This set and the use of multiple colors of detectors is disclosed in U.S. Pat. No. 7,927,287, Issued Apr.

19, 2011, entitled Herd Management Technology, which is assigned to Applicants' Assignee.

Figure 4:
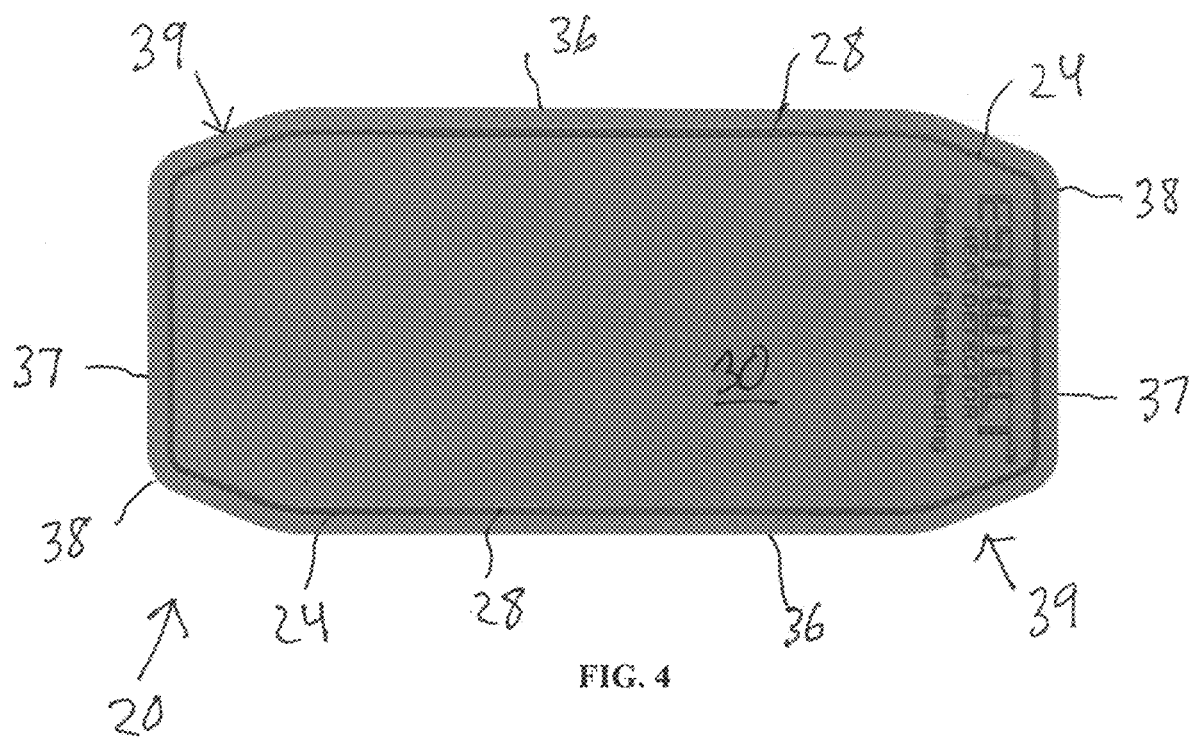
FIG. 4 is a top view of a first embodiment of the invention.
Figure 5:
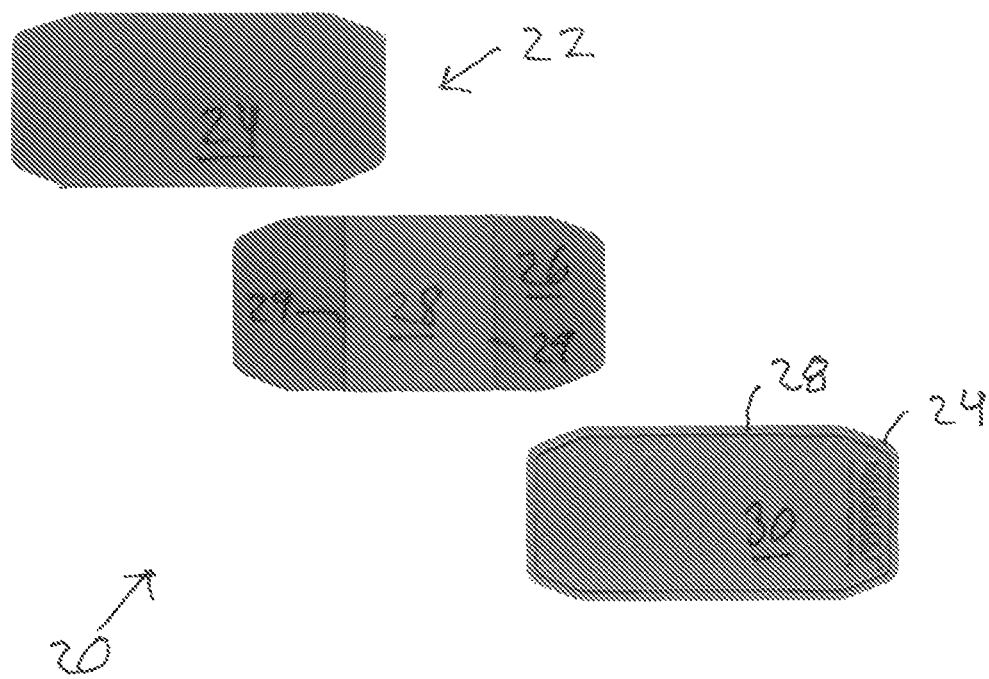
FIG. 5 is a layer view of the first embodiment.
Figure 6:
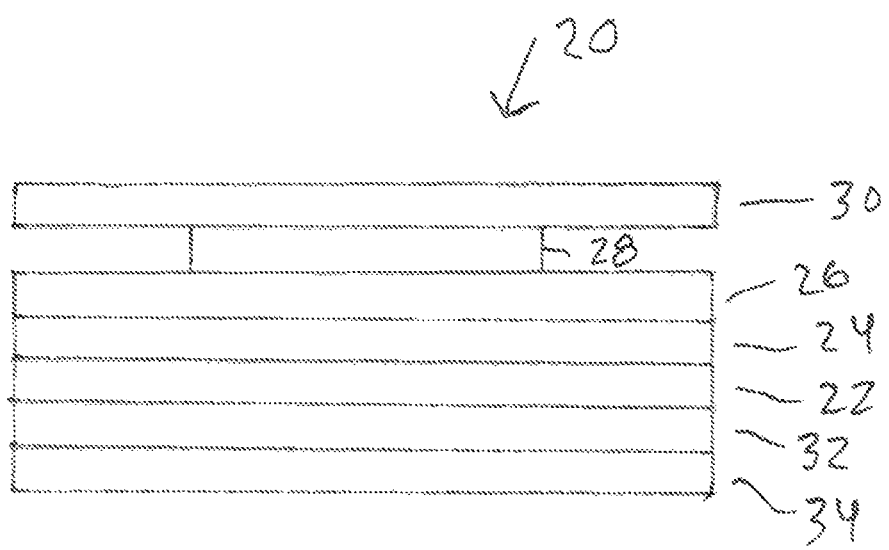
FIG. 6 is a cross-sectional representation of the first embodiment.

FIGS. 4 to 6 show a first embodiment of the detector 20 of the present invention. The detector 20 utilizes two different visual features, one of which is viewable at the end portions of the detector 20 and the second of which is viewable at the center of the detector 20, to increase the accuracy of breeding status indication. The visual features, preferably bright colors, are positive features which both become more visible as an obscuring layer is rubbed off during mounting. FIG. 4 is a top plan view of the detector 20. It has a generally rectangular shape with a long, side edges 36 (sides) and a relatively shorter end edges 37 (ends). The long axis is oriented along the spine of the cow, half way between the hip and the head of the tail of the cow. The detector preferably has radius corners 39. Further, the side edges are preferably inwardly tapered (i.e. towards the ends) at regions 39. The detector 20 has a patch-like construction. It is thin, flat and generally flexible. This permits it to be placed on the cow and remain in place for at least approximately thirty days despite being rubbed by other mounting cows. The preferred embodiment is 4.250 inches long and 2.00 inches wide.

FIGS. 5 and 6 show the components and layered construction of the detector 20. The layers of FIG. 6 are sized for order and clarity only, and not shown to scale. The detector 20 has a base layer 22 that has the outer geometry and coextensive dimensions of the device 20 as described above. The base layer 22 is preferably a thin, flexible vinyl material, preferably white vinyl. The base layer has a first or top side and an second or bottom side. A base ink layer 24 is applied to the first, top side of the base layer 22. The base ink layer 24 completely covers the base layer 22. The base ink layer 24 has a predetermined first color. The color is preferably bright for easy visualization, such as red/orange, green, blue, yellow or fuchsia (in this embodiment). The color may be fluorescent. The color of the base ink layer 24 constitutes a first signal when exposed for visualization. Significantly, the base ink layer is coextensive with the entire detector 20, and particularly the end portions or regions thereof. The base ink layer 24 is preferably laminated on the base layer 22, for example by a heat-roll lamination process. A clear covering layer 26 is applied to the base ink layer 24. The covering layer 26 is preferably a clear or transparent polyester. The covering layer 26 completely covers the base ink layer 24. To the covering layer 26 is applied a second, central or center ink layer 28. The central ink layer 28 has a predetermined second color, which, importantly, is different from the first color of the base ink layer 24. The color is preferably bright for easy visualization, such as red/orange, green, blue (in this embodiment), yellow or fuchsia. The color may be fluorescent. The color of the center ink layer 28 constitutes a second signal when exposed for visualization. The central ink layer 28 is disposed only in the center region of the detector 20. In this embodiment, the center ink layer 28 has a rectilinear configuration whereby it extends completely to the side edges 36 and a predetermined distance longitudinally toward each end 37, terminating in straight ends 29. Overall, the surface area of the central ink layer 28 is Fifty Percent (50%) of the area of the detector 20. A top flood coat layer 30 is disposed on top of the center ink layer 28 and extends coextensively to the outer periphery of the patch 20 (i.e. also over the poly layer 26, base ink layer 24 and base layer 22). The flood coat layer 30 is removable and is rubbed off during use via contact with mounting cows. The flood coat layer 30 is preferably an ink which is printed on. Most preferably, the ink is a Rub Off Ink SO 1.5 Special Silver, provided by Nazdar Ink Technologies. The color of the ink differs from both the color of the base ink layer 24 and the center ink layer 28, and preferably is grey or silver. This forms the top of the detector 20. A thin boundary channel 24 is preferably made in the flood coat layer 30 to show the colors of the base and center ink layers 24 and 28, respectively, to the user. To the second or bottom side of the base layer 22 is applied an adhesive layer 32. The adhesive bonds the patch 20 to the animal. The adhesive layer 32 also extends, coextensively, to the outer periphery of the base layer 22. Lastly, a release liner 34 is releasably coupled to the adhesive layer 32 to protect the adhesive from contact and activation during storage and prior to application of the patch 20 on the cow. The release liner 34 extends at least to the outer periphery of the adhesive layer 32.

The detector patch 20 is used by first warming it, preferably to approximately 100 F. Secondly, the release liner 34 is removed from the adhesive layer 32. Next, the patch 20 is aligned, longitudinally, with the spine of the cow (i.e. approximately half of the patch down its centerline positioned on each side of the spine), at a position half way between the hip and tail head. Next, the adhesive layer 32 of patch 20 is pressed into the clean dry hide of the cow and rubbed with bare fingers until it is firmly secured in place. Afterwards, the cow with patch 20 applied is released the herdsman into the population of other cows depending upon the breeding status which is sought by the herdsman, and the cow is monitored for activation or non-activation as described above.

Figure 7:
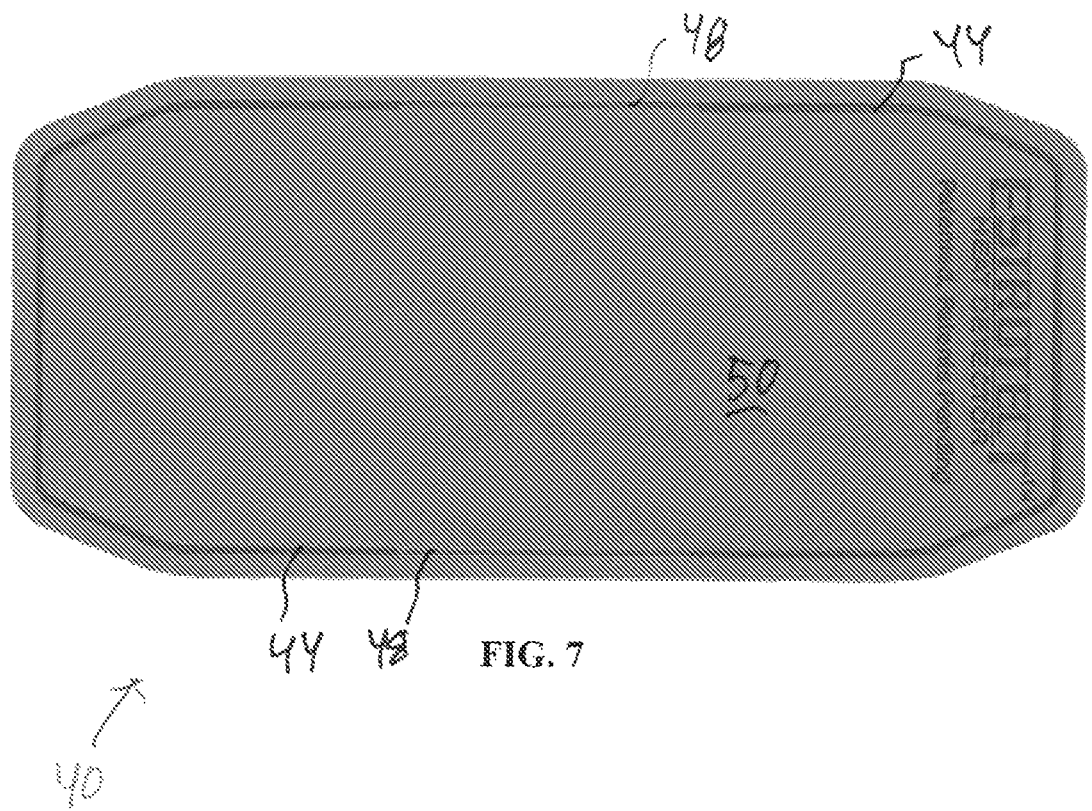
FIG. 7 is a top view of a second embodiment of the invention.
Figure 8:
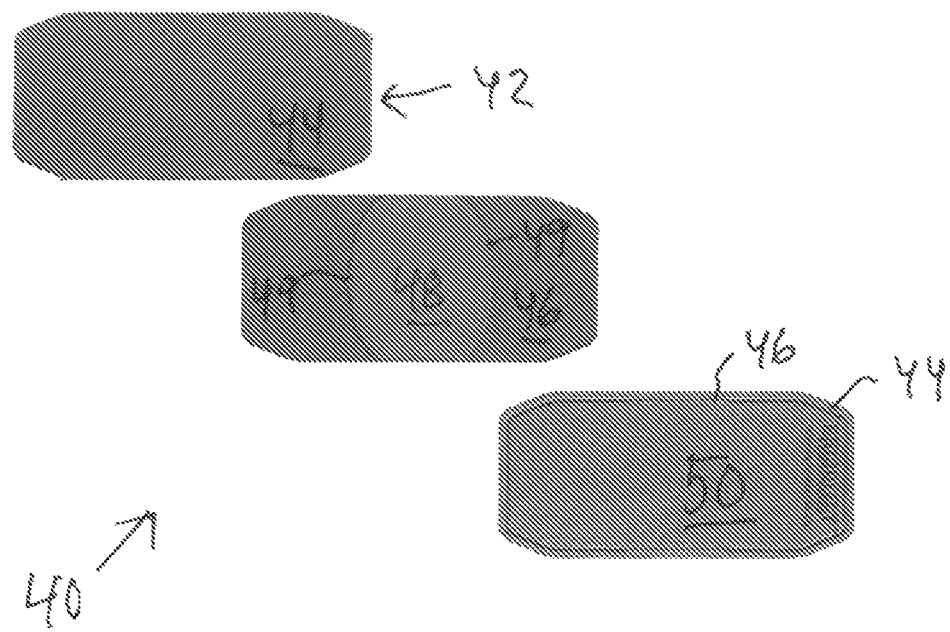
FIG. 8 is a layer view of the second embodiment.
Figure 9:
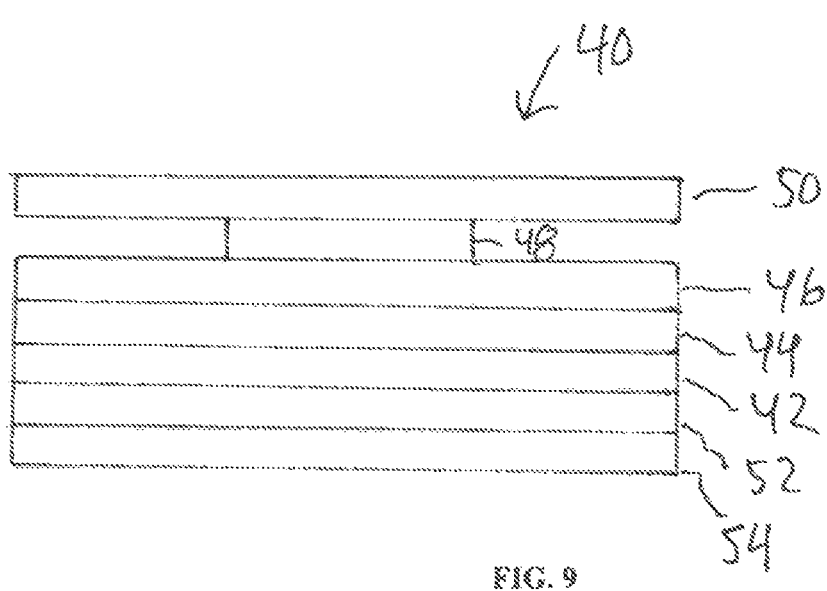
FIG. 9 is a cross-sectional representation of the second embodiment.

FIGS. 7 to 9 show a second embodiment of the detector 40 of the present invention. The detector 40 also utilizes two different visual features, one of which is viewable at the end portions of the detector 40 and the second of which is viewable at the center of the detector 40, to increase the accuracy of breeding status indication. The visual features, also preferably bright colors, are also positive features which both become more visible as an obscuring layer is rubbed off during mounting. FIG. 7 is a top plan view of the detector 40. It has a generally rectangular shape with a long, side edges (sides) and a relatively shorter end edges (ends). The long axis is oriented along the spine of the cow, half way between the hip and the head of the tail of the cow. The detector preferably has radius corners. Further, the side edges are preferably inwardly tapered (i.e. towards the ends). The detector 40 also has a patch-like construction. It is thin, flat and generally flexible. This permits it to be placed on the cow and remain in place for at least approximately thirty days despite being rubbed by other mounting cows. The preferred embodiment is also 4.250 inches long and 2.00 inches wide.

FIGS. 8 and 9 show the components and layered construction of the detector 40. The layers of FIG. 9 are sized for order and clarity only, and not shown to scale. The detector 40 has a base layer 42 that has the outer geometry and coextensive dimensions of the device 40 as described above. The base layer 42 is preferably a thin, flexible vinyl material. A base ink layer 44 is applied to the base layer 42. The base ink layer 44 completely covers the base layer 42. The base ink layer 44 has a predetermined first color. The color is preferably bright for easy visualization, such as red/orange, green, blue, yellow or fuchsia (in this embodiment). The color may be fluorescent. The color of the base ink layer 44 constitutes a first visual signal when exposed for visualization. Significantly, the base ink layer is coextensive with the entire detector 40, and particularly the end portions or regions thereof. The base ink layer 44 is preferably laminated on the base layer 42. A clear covering layer 46 is applied to the base ink layer 44. The covering layer 46 is preferably a clear polyester. The covering layer 46 completely covers the base ink layer 44. To the covering layer 46 is applied a second, central or center ink layer 48. The central ink layer 48 has a predetermined second color, which, importantly, is different from the first color of the base ink layer 44. The color is preferably bright for easy visualization, such as red/orange, green, blue (in this embodiment), yellow or fuchsia. The color may be fluorescent. The color of the center ink layer 48 constitutes a second visual signal when exposed for visualization. The central ink layer 48 is disposed only in the center region of the detector 40. In this embodiment, the center ink layer 48 has a rectilinear configuration it extends completely to the long side edges of the patch 40 and a predetermined distance longitudinally toward each end, but otherwise has a curvilinear configuration terminating in curved ends 49. Overall, the surface area of the central ink layer 48 is Forty Percent (40%) percent of the area of the detector 40. A top flood coat layer 50 is disposed on top of the center ink layer 48 and extends coextensively to the outer periphery of the patch 40 (i.e. also over the poly layer 46, base ink layer 44 and base layer 42). The flood coat layer 50 is removable and is rubbed off during use via contact with mounting cows. The flood coat layer 50 is preferably an ink which is printed on. Most preferably, the ink is a Rub Off Ink 60034974SO Special Silver SO 1.5, provided by Nazdar Ink Technologies. The color of the ink differs from both the color of the base ink layer 44 and the center ink layer 48, and preferably is grey or silver. This forms the top of the detector 40. A thin boundary channel 54 is preferably made in the flood coat layer 50 to show the colors of the base and center ink layers 44 and 48, respectively, to the user. To the bottom of the base layer 42 is applied an adhesive layer 52. The adhesive bonds the patch 40 to the animal. The adhesive layer 52 also extends, coextensively, to the outer periphery of the base layer 42. Lastly, a release liner 54 is releasibly coupled to the adhesive layer 52 to protect the adhesive from contact and activation during storage and prior to application of the patch 40 on the cow. The release liner 54 extends at least to the outer periphery of the adhesive layer 42.

Although the embodiments above have been described as having separate color and clear layers, it is within the purview of the invention that color and clear layers may be combined to form ink mixtures. And such mixture may then be applied to base layers, for example by lamination or other processes.

The detector patch 40 is used by first warming it, preferably to approximately 100 F. Secondly, the release liner 54 is removed from the adhesive layer 52. Next, the patch 40 is aligned, longitudinally, with the spine of the cow (i.e. approximately half of the patch down its centerline positioned on each side of the spine), at a position half way between the hip and tail head. Next, the adhesive layer 52 of patch 40 is pressed into the clean dry hide of the cow and rubbed with bare fingers until it is firmly secured in place. Afterwards, the cow with patch 40 applied is released the herdsman into the population of other cows depending upon the breeding status which is sought by the herdsman, and the cow is monitored for activation or non-activation as described above.

Figure 10:
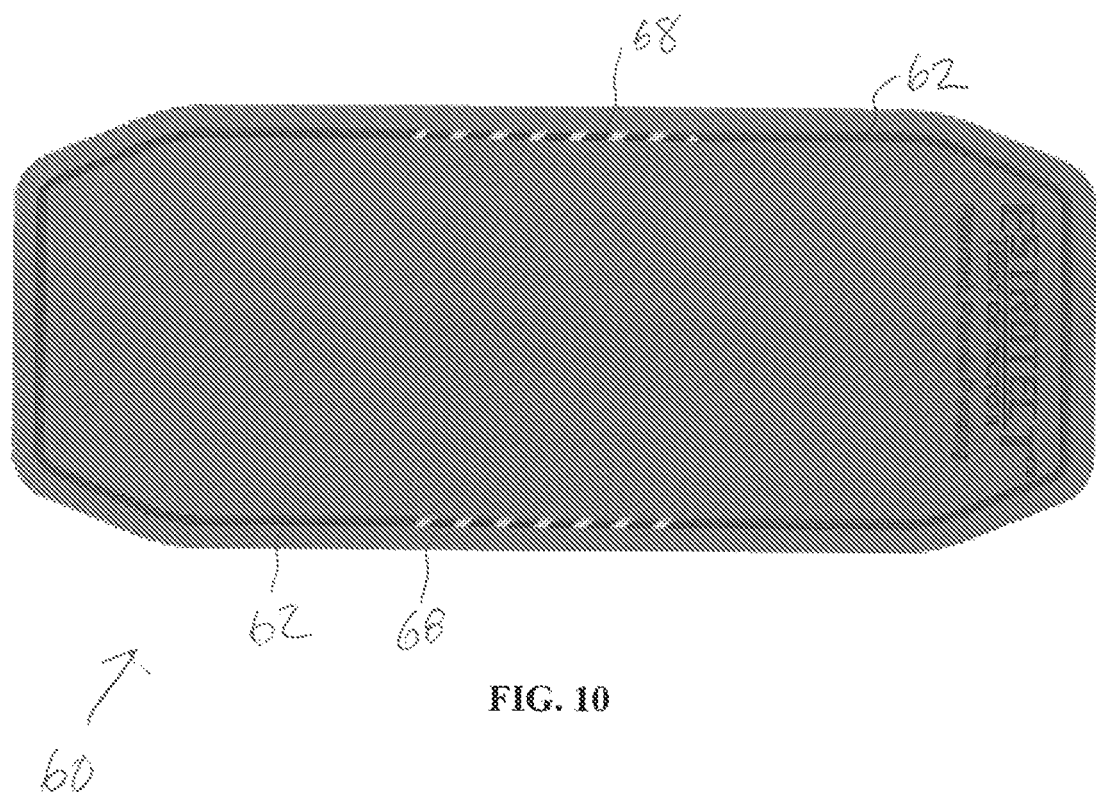
FIG. 10 is a top view of a third embodiment of the invention.

FIGS. 10 to 13 show a third embodiment of the detector 60 of the present invention. The detector 60 also utilizes two different visual features, one of which is viewable at the end portions of the detector 60 and the second of which is viewable at the center of the detector 60, to increase the accuracy of breeding status indication. The center indicator also has a different style (in this case hatched versus solid) to enhance visualization. Like detector 20 and 40 embodiments, the visual features are both positive features. FIG. 10 is a top plan view of the detector 60. It has a generally rectangular shape with a long, side edges (sides) and a relatively shorter end edges (ends). The long axis is oriented along the spine of the cow, half way between the hip and the head of the tail of the cow. The detector preferably has radius corners. Further, the side edges are preferably inwardly tapered (i.e. towards the ends). The detector 60 also has a patch-like construction. It is thin, flat and generally flexible. This permits it to be placed on the cow and remain in place for at least approximately thirty days despite being rubbed by other mounting cows. The preferred embodiment is also 4.250 inches long and 1.75 inches wide.

Figure 11:
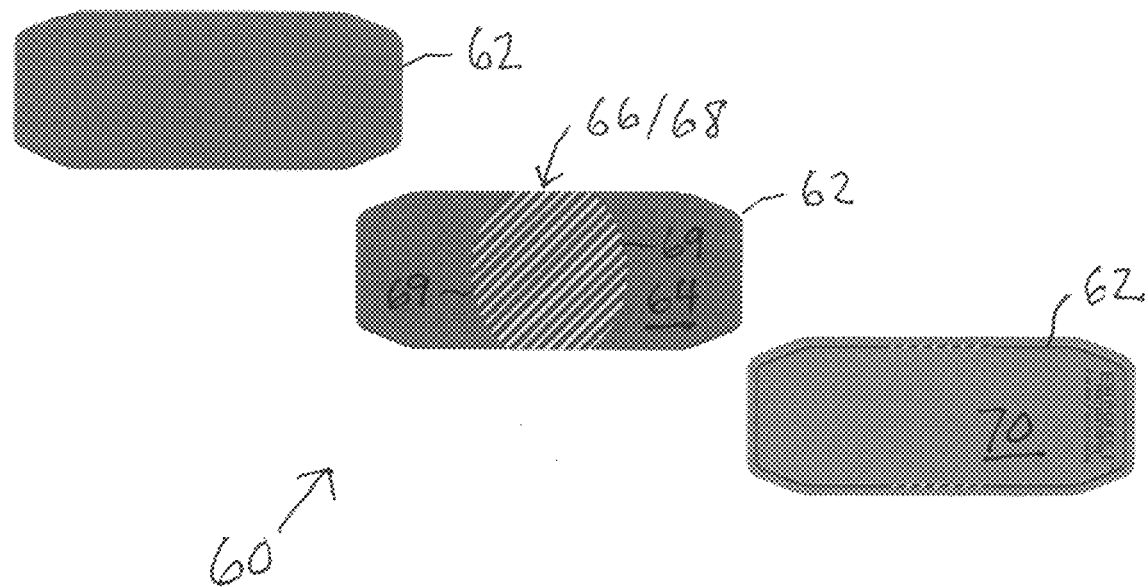
FIG. 11 is a layer view of the third embodiment.
Figure 12:
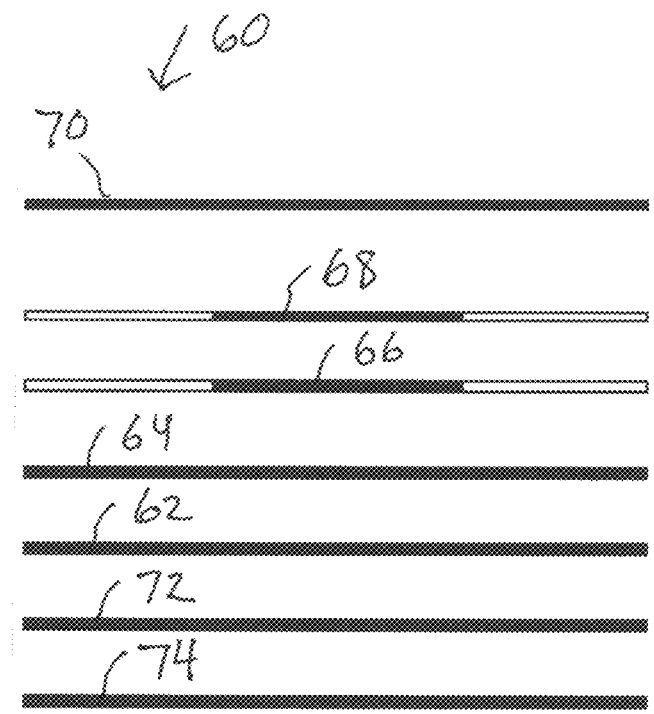
FIG. 12 is a cross-sectional representation of the third embodiment.
Figure 13:
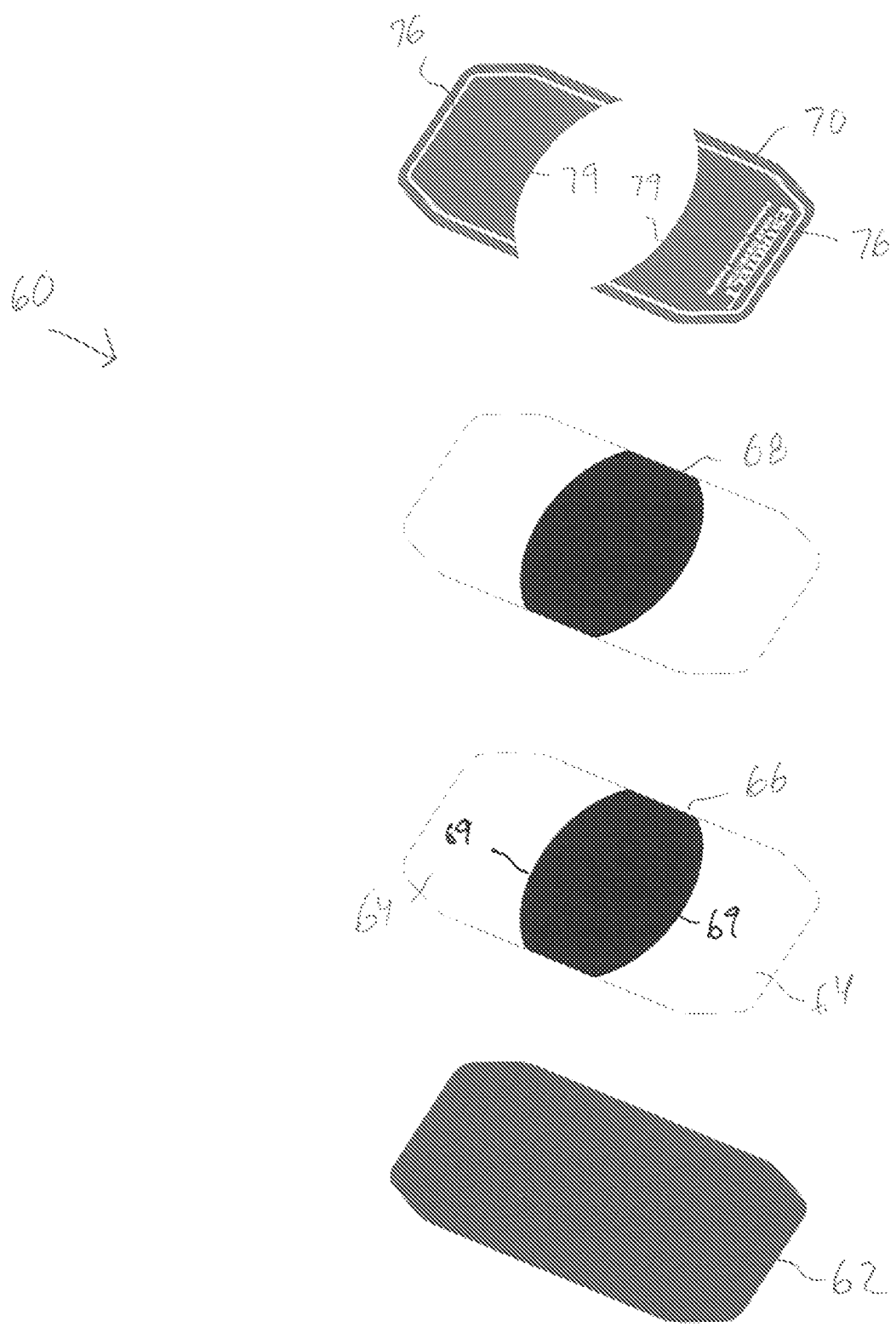
FIG. 13 is a three-dimensional layer representation of the third embodiment.

FIGS. 11, 12 and 13 show the components and layered construction of the detector 60. The layers of FIG. 12 are sized for order and clarity only, and not shown to scale. The detector 60 has a base layer 62 that has the outer geometry and coextensive dimensions of the device 60 as described above. The base layer 62 is preferably a thin, flexible vinyl material. The base layer 62 has a predetermined first color. The color is preferably bright for easy visualization, such as red/orange, green, blue, yellow or fuchsia (in this embodiment). The color may be fluorescent. The color of the base layer 62 constitutes a first signal when exposed for visualization. Significantly, the is coextensive with the entire detector 60, and particularly the end portions or regions thereof. A clear covering layer 64 is applied to the base layer 62. The covering layer 64 is preferably a clear polyester. The covering layer 64 completely covers the base layer 62. To the covering layer 64 is applied a central or center ink layer 66. The ink layer 66 is applied in a segmented or hatched format. The central ink layer 66 has a predetermined second color, which, importantly, is different from the first color of the base layer 62. The color is preferably bright for easy visualization, such as red/orange, green, blue (in this embodiment), yellow or fuchsia. The color may be fluorescent. The color of the center ink layer 66 constitutes a second visual signal when exposed for visualization. The central ink layer 66 is disposed only in the center region of the detector 60. In this embodiment, the center ink layer 66 has a rectilinear configuration it extends completely to the long side edges of the patch 60 and a predetermined distance longitudinally toward each end, but otherwise has a curvilinear configuration terminating in curved ends 69. Overall, the surface area of the central ink layer 66 is Forty Percent (40%) percent of the area of the detector 60. To the ink layer 66 is added a top clear ink layer 68. The clear layer 68 preferably extends only over the center ink layer 66. A top flood coat layer 70 is disposed on top of the poly layer 64 at the ends of the patch 60. The flood coat 70 extends away from the center region 66/68 toward the ends thereof, coextensively to the outer periphery of the patch 60 ends. The flood coat layer 70 is removable and is rubbed off during use via contact with mounting cows. The flood coat layer 70 is preferably an ink which is printed on. Most preferably, the ink is a Rub Off Ink 60034974SO Special Silver SO 1.5, provided by Nazdar Ink Technologies. The color of the ink differs from both the color of the base layer 62 and the center ink layer 66, and preferably is grey or silver. This forms the top of the detector 40. A thin boundary channel 76 is preferably made in the flood coat layer 70 to show the colors of the base layer 62 to the user. To the bottom of the base layer 62 is applied an adhesive layer 72. The adhesive bonds the patch 60 to the animal. The adhesive layer 72 also extends, coextensively, to the outer periphery of the base layer 62. Lastly, a release liner 74 is releasibly coupled to the adhesive layer 72 to protect the adhesive from contact and activation during storage and prior to application of the patch 60 on the cow. The release liner 74 extends at least to the outer periphery of the adhesive layer 72.

The detector patch 60 is used by first warming it, preferably to approximately 100 F. Secondly, the release liner 74 is removed from the adhesive layer 72. Next, the patch 60 is aligned, longitudinally, with the spine of the cow (i.e. approximately half of the patch down its centerline positioned on each side of the spine), at a position half way between the hip and tail head. Next, the adhesive layer 72 of patch 60 is pressed into the clean dry hide of the cow and rubbed with bare fingers until it is firmly secured in place. Afterwards, the cow with patch 60 applied is released the herdsman into the population of other cows depending upon the breeding status which is sought by the herdsman, and the cow is monitored for activation or non-activation as described above.

Figure 14:
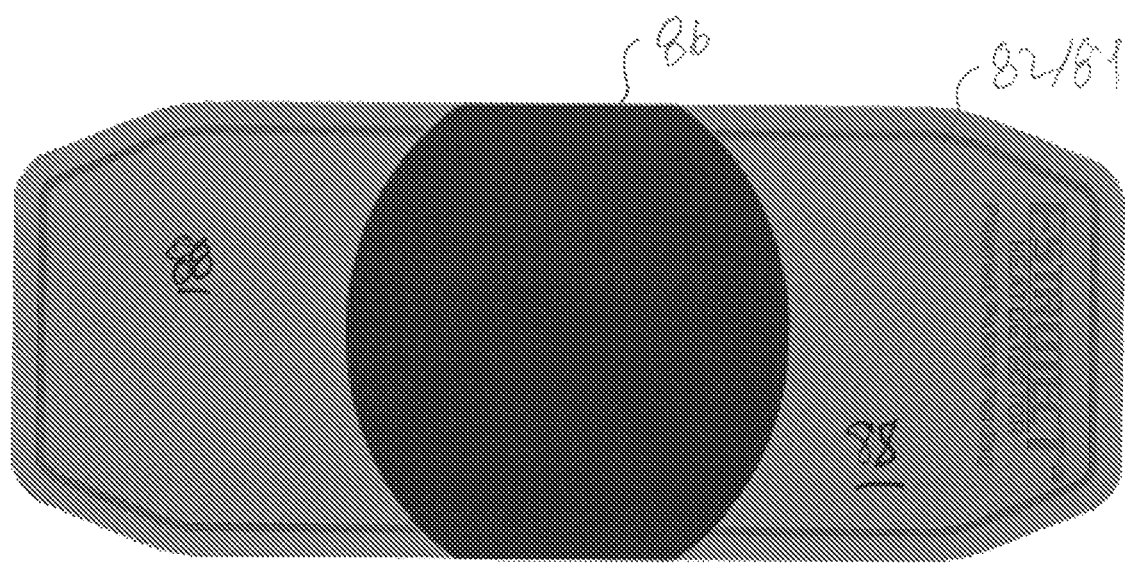
FIG. 14 is a top view of a fourth embodiment of the invention.
Figure 15:
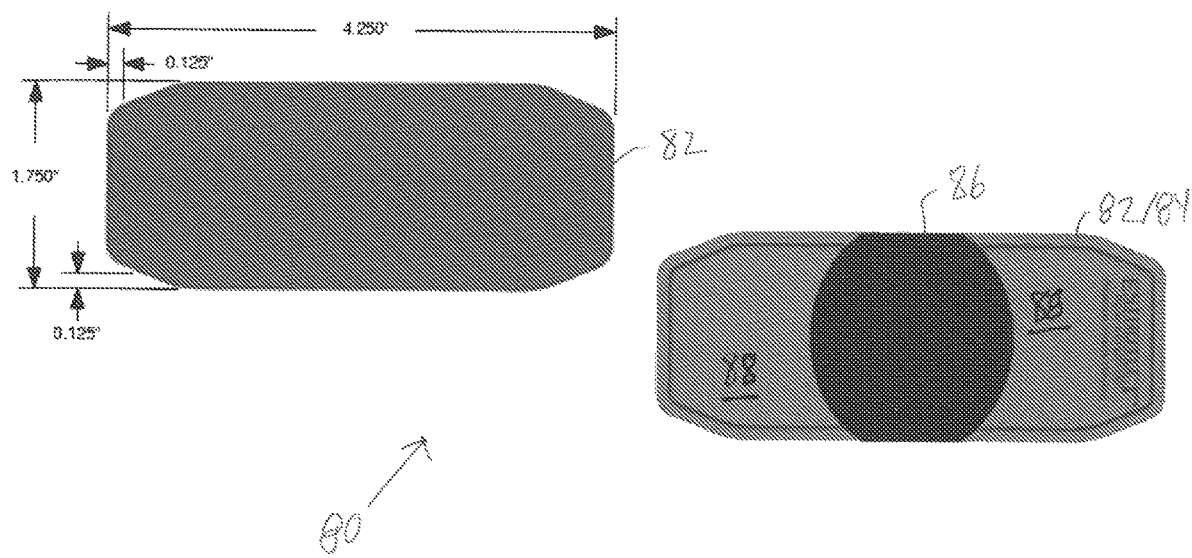
FIG. 15 is a layer view of the fourth embodiment.

FIGS. 14 to 17 show a fourth embodiment of the detector 80 of the present invention. The detector 80 utilizes two different visual features, one of which is viewable at the end portions of the detector 80 and the second of which is viewable at the center of the detector 80, to increase the accuracy of breeding status indication. Unlike detectors embodiments 20, 40 and 40, one feature (bright and at the ends) is obscured and becomes move visible (positive) as mounting occurs, but the other feature (dark and at the center) is removed (negative) as mounting occurs. Also, removal of the negative feature reveals an underlying positive feature. FIG. 14 is a top plan view of the detector 80. It has a generally rectangular shape with a long, side edges (sides) and a relatively shorter end edges (ends). The long axis is oriented along the spine of the cow, half way between the hip and the head of the tail of the cow. The detector preferably has radius corners. Further, the side edges are preferably inwardly tapered (i.e. towards the ends). The detector 80 also has a patch-like construction. It is thin, flat and generally flexible. This permits it to be placed on the cow and remain in place for at least approximately thirty days despite being rubbed by other mounting cows. The preferred embodiment is also 4.250 inches long and 1.75 inches wide.

Figure 16:
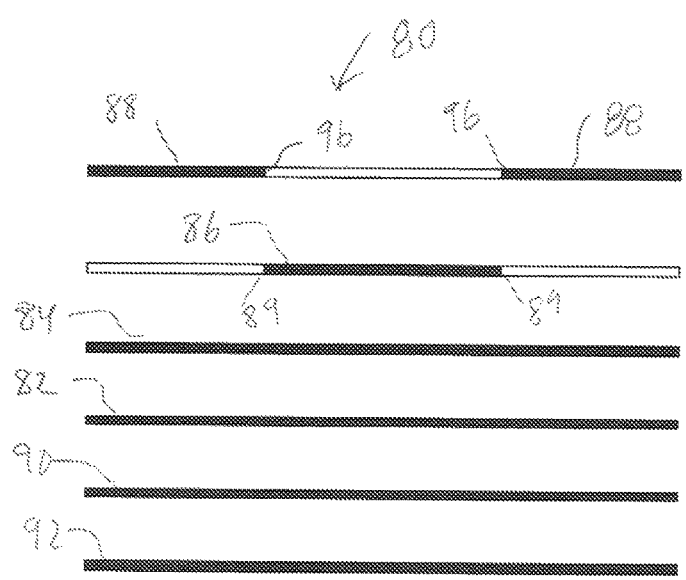
FIG. 16 is a cross-sectional representation of the fourth embodiment.
Figure 17:
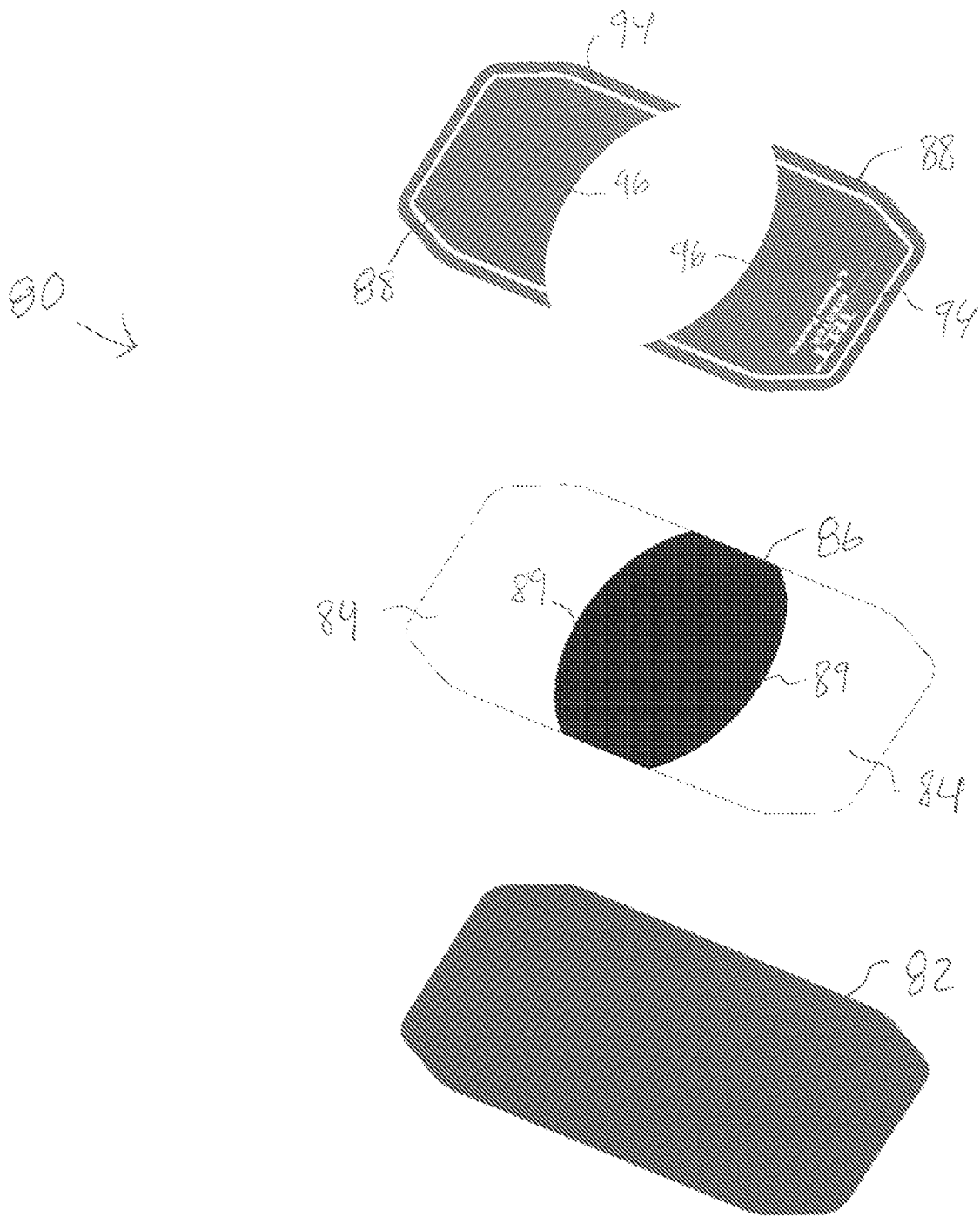
FIG. 17 is a three-dimensional layer representation of the fourth embodiment.

FIGS. 11, 12 and 13 show the components and layered construction of the detector 80. The layers of FIG. 16 are sized for order and clarity only, and not shown to scale. The detector 80 has a base layer 82 that has the outer geometry and coextensive dimensions of the device 80 as described above. The base layer 82 is preferably a thin, flexible vinyl material. The base layer 82 has a predetermined first color. The color must be a bright color, such as red/orange, green, blue, yellow or fuchsia (in this embodiment). The color may be fluorescent. The color of the base layer 82 constitutes a first signal when exposed for visualization. Significantly, the is coextensive with the entire detector 80, and particularly the end portions or regions thereof. A clear covering layer 84 is applied to the base layer 82. The covering layer 84 is preferably a clear polyester. The covering layer 84 completely covers the base layer 82. To the covering layer 84 is applied a central or center ink layer 86. Significantly, the central ink layer 86 has a color which is different from the color of the base layer 82, and it is removable by rubbing. More preferably, the color of the central ink layer is a dark contrast to the bright color of the base layer 82. Most preferably, the color is black. A preferred black ink is Nazdar 6003233SO Rub Off Black Ink. When and as the dark (preferably black) central color is removed, it exposes more and more of the bright first color of the base layer 82. The central ink layer 86 is disposed only in the center region of the detector 80. In this embodiment, the center ink layer 86 has a rectilinear configuration it extends completely to the long side edges of the patch 80 and a predetermined distance longitudinally toward each end, but otherwise has a curvilinear configuration terminating in curved ends 89. Curved ends 89 are more curved (rounded) than in the prior detector 60 embodiment. Overall, the surface area of the central ink layer 86 is Forty Percent (40%) percent of the area of the detector 80. A second flood coat layer 88 is disposed on top of the poly layer 84 at the ends of the patch 80. The flood coat 88 extends away from the center boundaries 96 (around outer boundaries 89 of ink layer 86) toward the ends thereof, coextensively to the outer periphery of the patch 80 ends. The flood coat layer 88 is removable and is rubbed off during use via contact with mounting cows. The flood coat layer 88 is preferably an ink which is printed on. Most preferably, the ink is a Rub Off Ink 60034974SO Special Silver SO 1.5, provided by Nazdar Ink Technologies. The color of the ink differs from both the color of the base layer 82 and the center ink layer 86, and preferably is grey or silver. A thin boundary channel 94 is preferably made in the flood coat layer 88 to show the colors of the base layer 82 to the user. To the bottom of the base layer 82 is applied an adhesive layer 90. The adhesive bonds the patch 80 to the animal. The adhesive layer 90 also extends, coextensively, to the outer periphery of the base layer 82. Lastly, a release liner 92 is releasibly coupled to the adhesive layer 90 to protect the adhesive from contact and activation during storage and prior to application of the patch 80 on the cow. The release liner 92 extends at least to the outer periphery of the adhesive layer 90.

The detector patch 80 is used by first warming it, preferably to approximately 100 F. Secondly, the release liner 92 is removed from the adhesive layer 90. Next, the patch 80 is aligned, longitudinally, with the spine of the cow (i.e. approximately half of the patch down its centerline positioned on each side of the spine), at a position half way between the hip and tail head. Next, the adhesive layer 90 of patch 80 is pressed into the clean dry hide of the cow and rubbed with bare fingers until it is firmly secured in place. Afterwards, the cow with patch 80 applied is released the herdsman into the population of other cows depending upon the breeding status which is sought by the herdsman, and the cow is monitored for activation or non-activation as described above.

Figure 18:
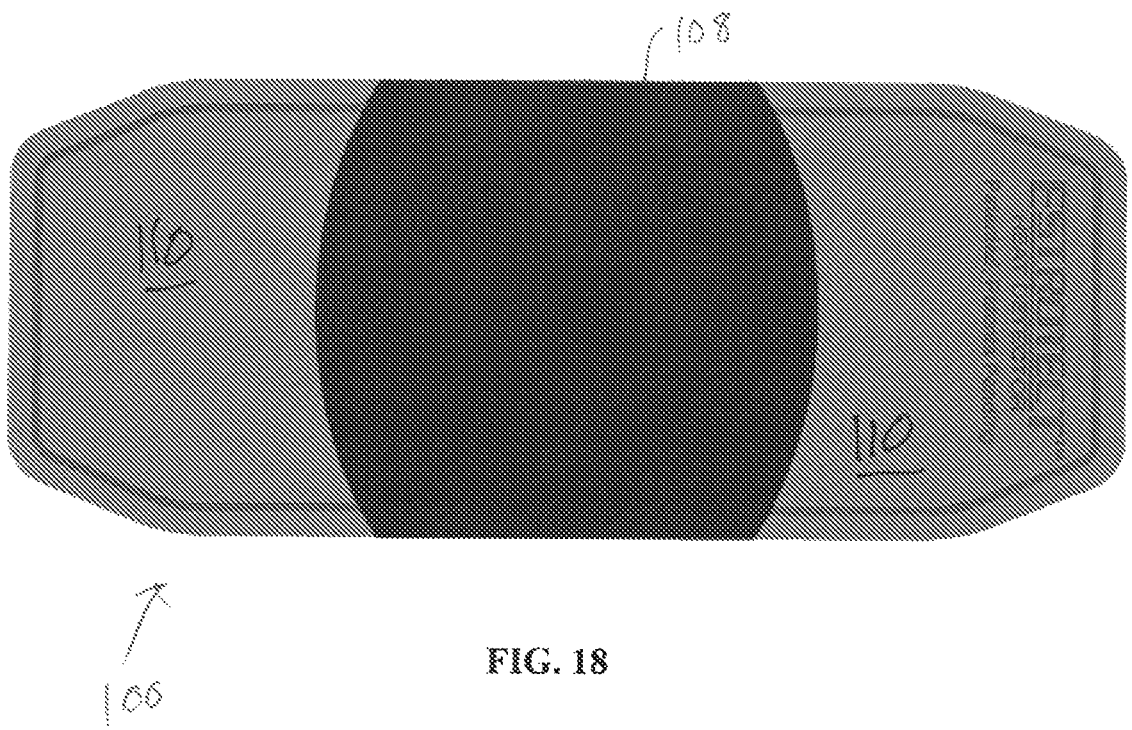
FIG. 18 is a top view of a fifth embodiment of the invention.

FIGS. 18 to 23 show a fifth embodiment of the detector 100 of the present invention. The detector 80 utilizes two different visual features, one of which is viewable at the end portions of the detector 100 and the second of which is viewable at the center of the detector 100, to increase the accuracy of breeding status indication. Like detector 100 embodiment, one feature (bright and at the ends) is obscured and becomes move visible (positive) as mounting occurs, but the other feature (dark and at the center) is removed (negative) as mounting occurs. Also similarly, removal of the negative feature reveals an underlying positive feature. FIG. 18 is a top plan view of the detector 100. It has a generally rectangular shape with a long, side edges (sides) and a relatively shorter end edges (ends). The long axis is oriented along the spine of the cow, half way between the hip and the head of the tail of the cow. The detector preferably has radius corners. Further, the side edges are preferably inwardly tapered (i.e. towards the ends). The detector 100 also has a patch-like construction. It is thin, flat and generally flexible. This permits it to be placed on the cow and remain in place for at least approximately thirty days despite being rubbed by other mounting cows. The preferred embodiment is also 4.250 inches long and 1.75 inches wide.

Figure 19:
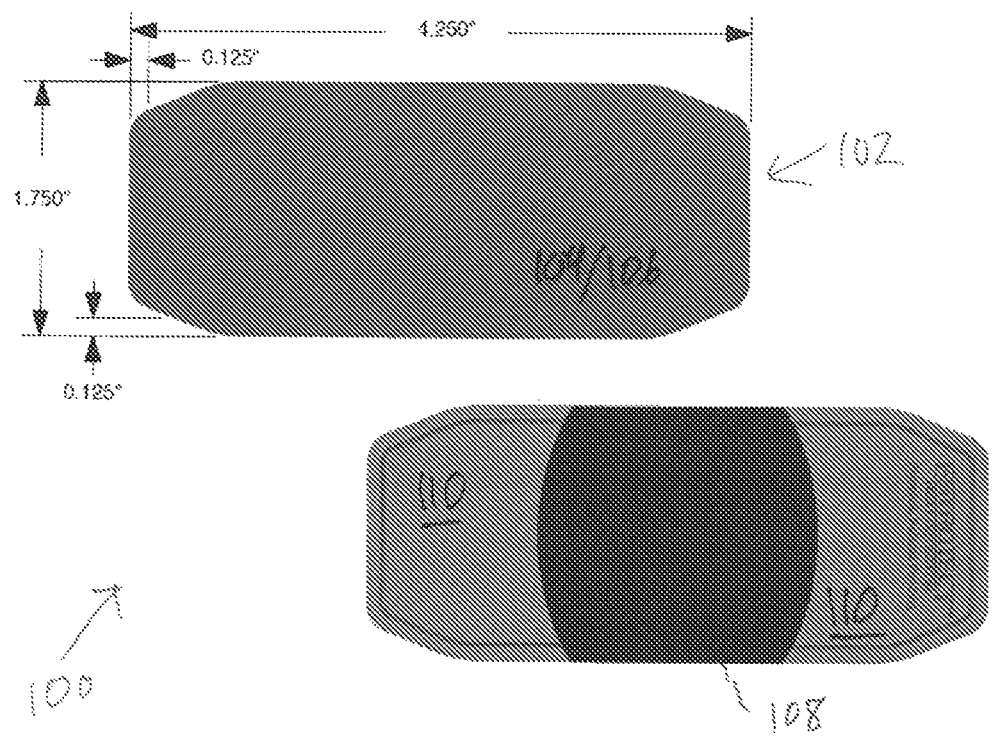
FIG. 19 is a layer view of the fifth embodiment.
Figure 20:
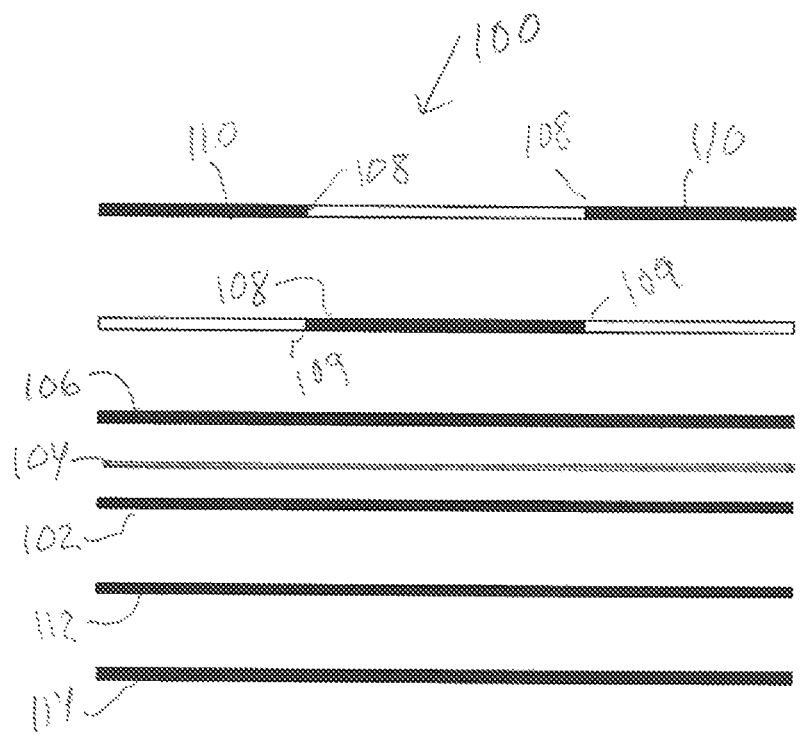
FIG. 20 is a cross-sectional representation of the fifth embodiment.
Figure 21:
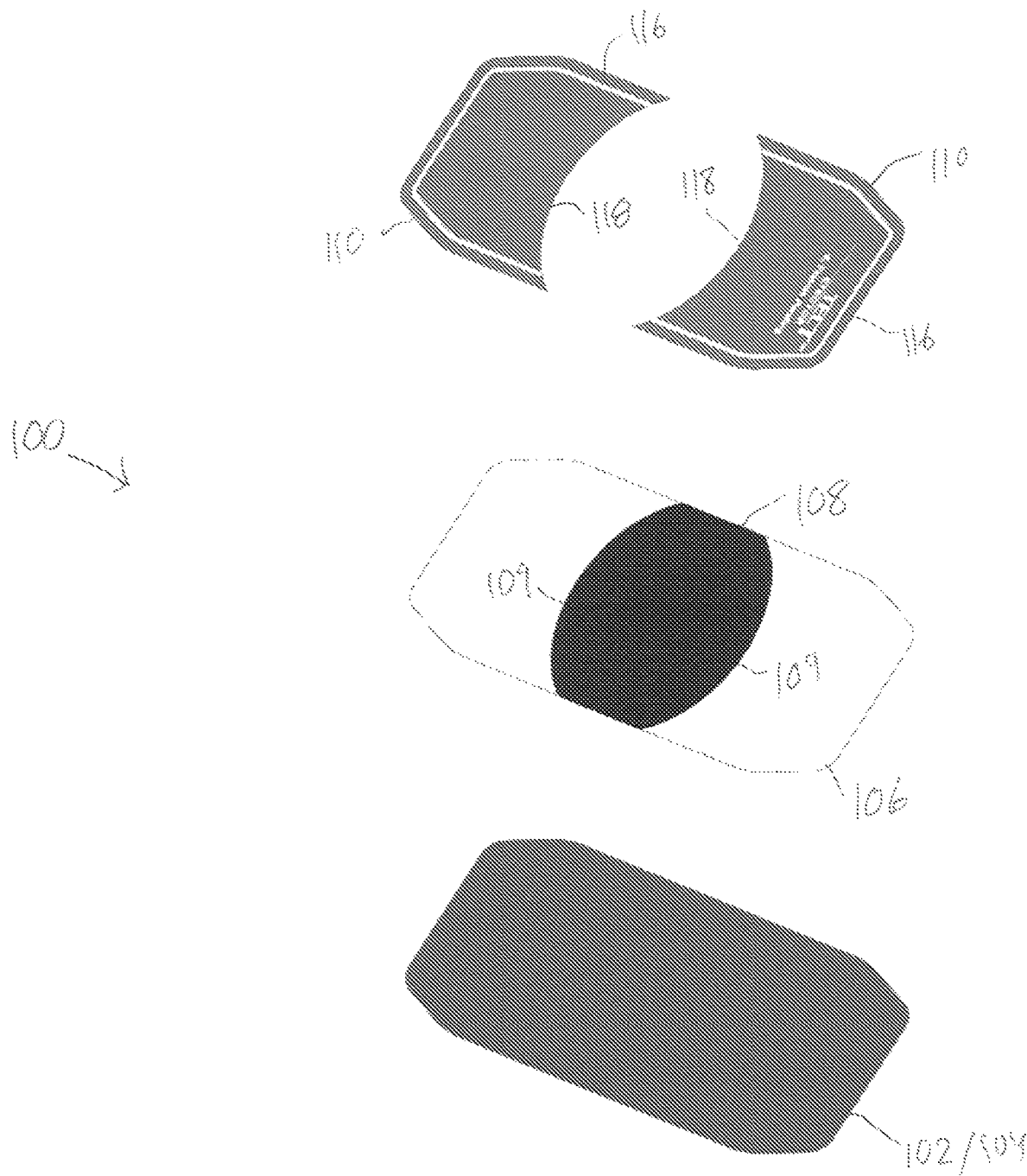
FIG. 21 is a three-dimensional layer representation of the fifth embodiment.

FIGS. 19, 20 and 21 show the components and layered construction of the detector 100. The layers of FIG. 19 are sized for order and clarity only, and not shown to scale. The detector 100 has a base layer 102 that has the outer geometry and coextensive dimensions of the device 100 as described above. The base layer 102 is preferably a thin, flexible vinyl material. A base ink layer 104 is applied to the base layer 102. The base ink layer 104 completely covers the base layer 102. The base ink layer 104 has a predetermined first color. The color is preferably bright for easy visualization, such as red/orange, green, blue, yellow or fuchsia (in this embodiment). The color may be fluorescent. The color of the base ink layer 104 constitutes a first signal when exposed for visualization. Significantly, the base ink layer 104 is coextensive with the entire detector 100, and particularly the end portions or regions thereof. The base ink layer 104 is preferably laminated on the base layer 102. A clear covering layer 106 is applied to the base ink layer 104. The covering layer 106 is preferably a clear polyester. The covering layer 106 completely covers the base ink layer 104. To the covering layer 106 is applied a central or center ink layer 108. Significantly, the central ink layer 108 has a color which is different from the color of the base layer 82, and it is removable by rubbing. More preferably, the color of the central ink layer is a dark contrast to the bright color of the base ink layer 104. Most preferably, the color is black. When and as the dark (preferably black) central color is removed, it exposes more and more of the bright first color of the base ink layer 104. The central ink layer 108 is disposed only in the center region of the detector 100. In this embodiment, the center ink layer 108 has a rectilinear configuration it extends completely to the long side edges of the patch 100 and a predetermined distance longitudinally toward each end, but otherwise has a curvilinear configuration terminating in curved ends 109. Overall, the surface area of the central ink layer 108 is Forty Five Percent (45%) percent of the area of the detector 100. A second flood coat layer 110 is disposed on top of the poly layer 106 at the ends of the patch 100. The flood coat 110 extends away from the center boundaries 118 (around outer boundaries 109 of ink layer 108) toward the ends thereof coextensively to the outer periphery of the patch 100 ends. The flood coat layer 110 is removable and is rubbed off during use via contact with mounting cows. The flood coat layer 110 is preferably an ink which is printed on. Most preferably, the ink is a Rub Off Ink 60034974SO Special Silver SO 1.5, provided by Nazdar Ink Technologies. The color of the ink differs from both the color of the base ink layer 104 and the center ink layer 108, and preferably is grey or silver. A thin boundary channel 116 is preferably made in the flood coat layer 110 to show the colors of the base ink layer 104 to the user. To the bottom of the base layer 102 is applied an adhesive layer 112. The adhesive bonds the patch 100 to the animal. The adhesive layer 112 also extends, coextensively, to the outer periphery of the base layer 102. Lastly, a release liner 114 is releasibly coupled to the adhesive layer 112 to protect the adhesive from contact and activation during storage and prior to application of the patch 100 on the cow. The release liner 114 extends at least to the outer periphery of the adhesive layer 112.

The detector patch 100 is used by first warming it, preferably to approximately 100 F. Secondly, the release liner 114 is removed from the adhesive layer 112. Next, the patch 100 is aligned, longitudinally, with the spine of the cow (i.e. approximately half of the patch down its centerline positioned on each side of the spine), at a position half way between the hip and tail head. Next, the adhesive layer 112 of patch 100 is pressed into the clean dry hide of the cow and rubbed with bare fingers until it is firmly secured in place. Afterwards, the cow with patch 100 applied is released the herdsman into the population of other cows depending upon the breeding status which is sought by the herdsman, and the cow is monitored for activation or non-activation as described above.

Figure 22:
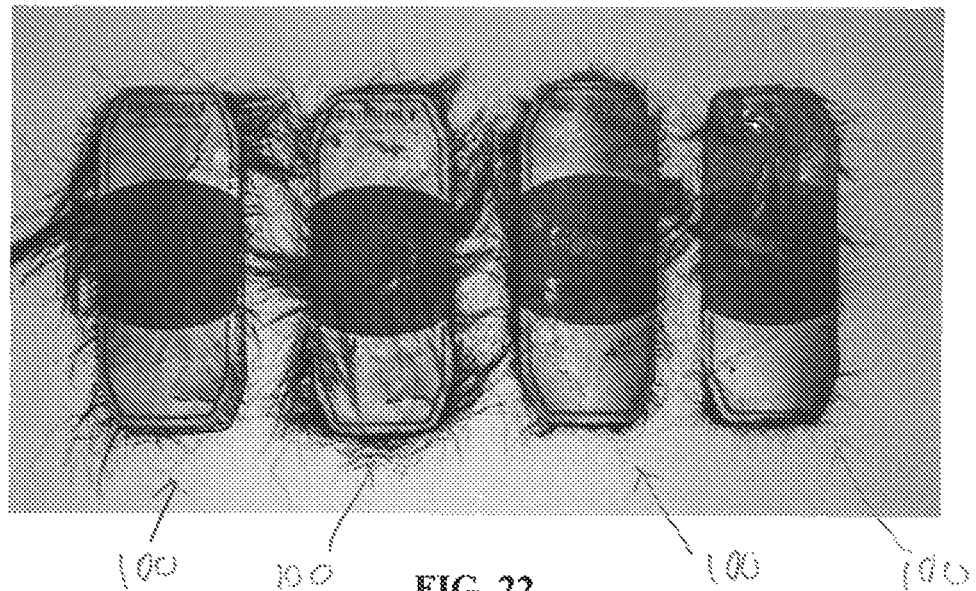
FIG. 22 shows four (4) detectors constructed according to the embodiment of FIGS. 18-21 which are deemed not activated according to the invention.
Figure 23:
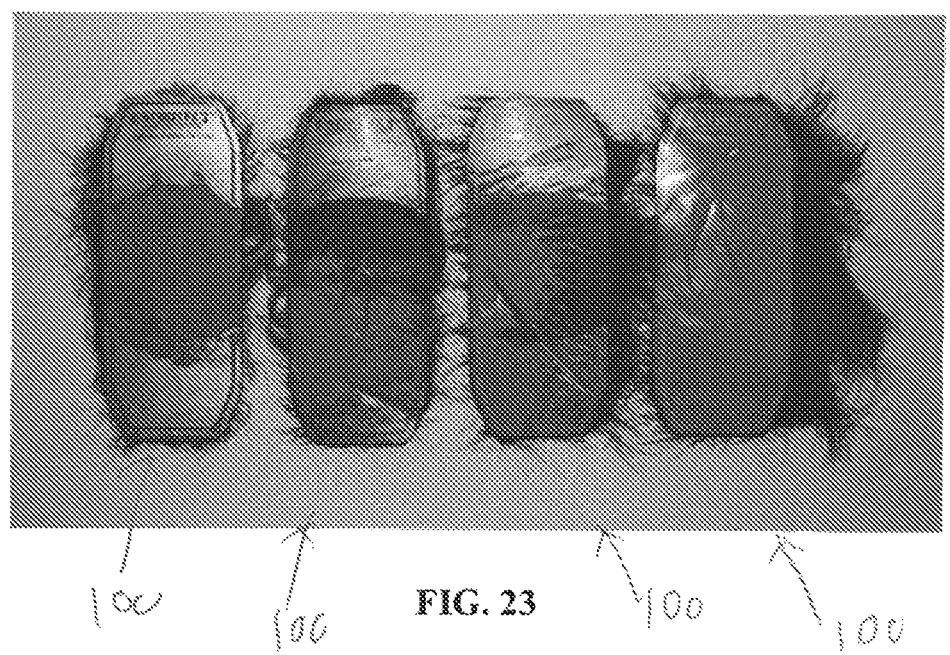
FIG. 23 shows four (4) detectors constructed according to the embodiment of FIGS. 18-21 which are deemed activated according to the invention.

FIG. 22 shows four (4) detectors constructed according to the embodiment of FIGS. 18-21 which are deemed not activated according to the invention, and are representative of typical results. These specimen detectors correspond to cows which were shown to be not in estrus. The level of wear decreases going left from the maximum non activated state on the right. FIG. 23 shows four (4) detectors constructed according to the embodiment of FIGS. 18-21 which are deemed activated according to the invention. These are also representative of typical results. These specimen detectors correspond to cows which were shown to be in estrus. The level of wear and degree of activation increases going to the right from the minimum activated state on the left. Significantly, initial wear occurs near the middle region of the detector first (minimum degree of activation).

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A bovine estrus detection device, comprising
a generally rectangular base having sides and ends, the base having a predetermined length and a predetermined width, the width being less than the length, the base having a first side and a second side, and wherein the first side of the base has a central region having a first color and end regions having a second color, the second color being different from the first color;
an adhesive disposer on the second side of the base for coupling the base to a female cow or heifer; and
a removable coating disposed over the first side of the base, the removable coating being exposed for contact by male or female cows mounting the female cow or heifer which the device is attached, and adapted to being removed by such mounting mate or female cows, wherein during use, exposure of the first color or disappearance of the second color is indicative of detector actuation.

2. The bovine estrus detection device of claim 1, wherein the central region of the first side of the base has at least one rectilinear periphery.

3. The bovine estrus detection device of claim 1, wherein the central region of the first side of the base has at least one curvilinear periphery.

4. The bovine estrus detection device of claim 1, wherein the first color is solid.

5. The bovine estrus detection device of claim 1, wherein detector actuation is indicated when fifty percent (50%) or more of the first color is shown.

6. The bovine estrus detection device of claim 1, wherein the first side of the base has a predetermined first area, and wherein the central region of the first side of the base has a predetermined second area, and wherein the second area is between 40 and 55 percent of the first area.

7. The bovine estrus detection device of claim 1, wherein base, adhesive, and removable coating are disposed in layers, whereby the device is a flexible patch.

8. The bovine estrus detection device of claim 1, wherein the first and second colors on the first side of the base are integrated into the base.

9. The bovine estrus detection device of claim 1, wherein the first and second colors are disposed in layers on the base, the second color being disposed in a first layer over the entire first side of the base, the second color being disposed in a second layer over the first layer, at the central region.

10. A bovine estrus detection device, comprising
a generally rectangular base having sides and ends, the base having predetermined length and a predetermined width, the width being less than the length, the base having a first side and a second side, and wherein the first side of the base has a first color;
an adhesive disposed on the second side of the base far coupling the base to a female cow or heifer;
a first removable coating disposed over the first side of the base at a central region of the first side, the first removable coating having a second color, the second color being different from the first color; and
a second removable coating disposed over the first side of the base at end regions of the first side, the second removable coating having a third color;
the first and second removable coatings being exposed for contact by male or female cow mounting the female cow or heifer to which the device is attached, and adapted to being removed by such mounting male or female cows, whereby the first color becomes visible;
wherein, during use, exposure of the first color or disappearance of the second color is indicative of detector actuation.

11. The bovine estrus detection device of claim 10, wherein the central region of the first side of the base has at least one rectilinear periphery.

12. The bovine estrus detection device of claim 10, wherein the central region of the first side of the base has at least one curvilinear periphery.

13. The bovine estrus detection device of claim 10, wherein the first color is solid.

14. The bovine estrus detection device of claim 10, wherein the first side of the base has a predetermined first area, and wherein the central region of the first side of the base has a predetermined second area, and wherein the second area is between 40 and 55 percent of the first area.

15. The bovine estrus detection device of claim 10, wherein base, adhesive, and first and second removable coatings are disposed in layers, whereby the device is a flexible patch.

16. The bovine estrus detection device of claim 10, wherein the first color is integrated into the base.

17. The bovine estrus detection device of claim 10, wherein the first, second and third colors are disposed in layers on the base, the first color being disposed in a layer over the entire first side of the base, the second color being disposed at the central region, and the third color being disposed at the end regions.

* * * * *